United States Patent
Thiel et al.

(10) Patent No.: US 10,036,826 B2
(45) Date of Patent: Jul. 31, 2018

(54) INVERSION TECHNIQUES FOR REAL-TIME WELL PLACEMENT AND RESERVOIR CHARACTERIZATION

(71) Applicant: Schlumberger Technology Corporation, Sugar Land, TX (US)

(72) Inventors: Michael Thiel, Cambridge, MA (US); Dzevat Omeragic, Lexington, MA (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/123,201

(22) PCT Filed: Mar. 3, 2015

(86) PCT No.: PCT/US2015/018433
§ 371 (c)(1),
(2) Date: Sep. 1, 2016

(87) PCT Pub. No.: WO2015/134455
PCT Pub. Date: Sep. 11, 2015

(65) Prior Publication Data
US 2017/0075021 A1    Mar. 16, 2017

Related U.S. Application Data

(60) Provisional application No. 62/069,131, filed on Oct. 27, 2014, provisional application No. 61/948,506, filed on Mar. 5, 2014.

(51) Int. Cl.
*G01V 3/20* (2006.01)
*G01V 3/38* (2006.01)
*E21B 47/12* (2012.01)

(52) U.S. Cl.
CPC ............ *G01V 3/20* (2013.01); *E21B 47/122* (2013.01); *G01V 3/38* (2013.01)

(58) Field of Classification Search
CPC .... G01V 3/00–3/40; G01V 5/04–5/145; E21B 47/12–47/187
See application file for complete search history.

(56) References Cited

U.S. PATENT DOCUMENTS

| 6,163,155 A | 12/2000 | Bittar |
| 6,594,584 B1 | 7/2003 | Omeragic et al. |

(Continued)

FOREIGN PATENT DOCUMENTS

| WO | WO2013116099 A1 | 8/2013 |
| WO | 2013149125 | 10/2013 |

OTHER PUBLICATIONS

Li et al., "New directional electromagnetic tool for proactive geosteering and accurate formation evaluation while drilling," 46th SPWLA Annual Symposium, New Orleans, LA, Jun. 26-29, 2005.

(Continued)

*Primary Examiner* — Huy Q Phan
*Assistant Examiner* — David Frederiksen

(57) ABSTRACT

A method is disclosed herein. The method includes disposing an electromagnetic logging tool in a borehole penetrating a formation, the electromagnetic logging tool being part of a drill string in the formation, the drill string having a drill bit. The method includes acquiring measurements using the electromagnetic logging tool. Further, the method includes using a processor, applying a pixel-based inversion to the acquired measurements to determine at least one formation property, wherein applying the pixel-based inversion includes using adaptive regularization.

16 Claims, 10 Drawing Sheets

(56) References Cited

U.S. PATENT DOCUMENTS

| | | | |
|---|---|---|---|
| 6,911,824 B2 | 6/2005 | Bittar | |
| 7,366,616 B2 | 4/2008 | Bennett et al. | |
| 7,640,110 B2 | 12/2009 | Abubakar et al. | |
| 8,694,299 B2* | 4/2014 | Krebs | G01V 11/00 702/11 |
| 8,898,102 B2* | 11/2014 | Skogman | G06N 99/005 706/50 |
| 2007/0127315 A1* | 6/2007 | Tompkins | G01V 3/083 367/75 |
| 2007/0285274 A1* | 12/2007 | Esmersoy | E21B 21/08 340/853.5 |
| 2010/0185393 A1* | 7/2010 | Liang | G01V 3/28 702/7 |
| 2010/0198519 A1 | 8/2010 | Wilt et al. | |
| 2010/0231220 A1* | 9/2010 | Alumbaugh | E21B 7/04 324/338 |
| 2010/0259267 A1 | 10/2010 | Rosthal et al. | |
| 2010/0283470 A1* | 11/2010 | Streinz | G01V 3/30 324/338 |
| 2011/0074427 A1 | 3/2011 | Wang et al. | |
| 2011/0238312 A1 | 9/2011 | Seydoux et al. | |
| 2012/0097450 A1 | 4/2012 | Wessling et al. | |
| 2012/0283951 A1* | 11/2012 | Li | G01V 3/28 702/7 |

OTHER PUBLICATIONS

Omeragic et al., "Deep Directional Electromagnetic Measurements for Optimal Well Placement", SPE 97045, 2005 SPE Annual Technical Conference and Exhibition, Dallas, TX, Oct. 9-12, 2005.

Omeragic et al., "Real-Time Interpretation of Formation Structure From Directional EM Measurements," 47th SPWLA Annual Symposium, Veracruz, Mexico, Jun. 4-7, 2006.

Dennis et al., "Numerical Methods for Unconstrained Optimization and Nonlinear Equations", SIAM Classics in Applied Mathematics, 1996.

Nocedal et al., "Numerical Optimization", Second Edition, Springer Series in Operations Research, 2006.

Abubakar et al., "A three-dimensional parametric inversion algorithm for triaxial induction data", Jan. 2005.

Ekblom et al., "Algorithms for non-linear Huber estimation", BIT 29, 1989, pp. 60-76.

Farquharson et al., "Non-linear inversion using general measures of data misfit and model structure", Geophys. J. Int. (1998) 134, pp. 213-227.

Bube et al., "Hybrid l1/l2 minimization with applications to tomography", Geophysics, vol. 62, No. 4, Jul. 1997, pp. 1183-1195.

Constable et al., "Occam's inversion: A practical algorithm for generation smooth models from electromagnetic sounding data", Geophysics, vol. 52, No. 3, pp. 289-300, 1987.

Farquharson et al., "A comparison of automatic techniques for estimating the regularization parameter in non-linear inverse problems", Geophys. J. Int. (2004) 156, pp. 411-425.

Abubakar et al., Inversion algorithms for large-scale geophysical electromagnetic measurements., IOP Publishing, Inverse Problems 20 (2009) 123012(30pp), Dec. 3, 2009.

International Search Report and Written Opinion issued in PCT/US2015/018433 dated Jun. 23, 2015. 12 pages.

International Preliminary Report on Patentability issued in PCT/US2015/018433 dated Sep. 15, 2016. 9 pages.

Search Report Rule 62 EPC and Search Opinion issued in European Patent Application 15759307.0 dated Sep. 18, 2017. 10 pages.

Guitton et al., Robust inversion of seismic data using the Huber norm. Geophysics, col. 68, No. 4, Jul. 1, 2003. pp. 1310-1319.

* cited by examiner

PIXEL USING OCCAM'S INVERSION L1-NORM

PIXEL USING OCCAM'S INVERSION L2-NORM

PIXEL USING OCCAM'S INVERSION (RESULT FOR Rh)

PIXEL USING OCCAM'S INVERSION (RESULT FOR ANISOTROPY)

50 FT.

400 FT.

INVERSION TECHNIQUES FOR REAL-TIME WELL PLACEMENT AND RESERVOIR CHARACTERIZATION

RELATED APPLICATIONS

The present application is related to Provisional Application Ser. No. 61/948,506, filed on Mar. 5, 2014 and entitled "INVERSION TECHNIQUES FOR REAL-TIME WELL PLACEMENT," and Provisional Application Ser. No. 62/069,131, filed on Oct. 27, 2014 and entitled "INVERSION TECHNIQUES FOR REAL-TIME WELL PLACEMENT," both of which are hereby incorporated by reference in their entirety.

BACKGROUND

1. Technical Field

The present disclosure relates generally to the field of subsurface exploration and, more particularly, to techniques for determining subsurface parameters and well placement.

2. Background Information

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools have long been used in wellbores to make, for example, formation evaluation measurements to infer properties of the formations surrounding the borehole and the fluids in the formations. Common logging tools include electromagnetic tools, nuclear tools, acoustic tools, and nuclear magnetic resonance (NMR) tools, though various other types of tools for evaluating formation properties are also available.

Early logging tools were run into a wellbore on a wireline cable after the wellbore had been drilled. Modern versions of such wireline tools are still used extensively. However, as the demand for information while drilling a borehole continued to increase, measurement-while-drilling (MWD) tools and logging-while-drilling (LWD) tools have since been developed. MWD tools typically provide drilling parameter information such as weight on the bit, torque, temperature, pressure, direction, and inclination. LWD tools typically provide formation evaluation measurements such as resistivity, porosity, NMR distributions, and so forth. MWD and LWD tools often have characteristics common to wireline tools (e.g., transmitting and receiving antennas, sensors, etc.), but MWD and LWD tools are designed and constructed to endure and operate in the harsh environment of drilling.

Electromagnetic (EM) logging tools have been employed in the field of subsurface exploration for many years. These types of logging tools or instruments usually include an elongated support equipped with antennas that are operable as sources (transmitters) or sensors (receivers). The antennas on these tools are generally formed as loops or coils of conductive wires, and may be configured to have dipole moments that are axial (parallel with tool axis), transverse (perpendicular to the tool axis), or tilted (neither parallel nor perpendicular to the tool axis). In operation, a transmitter antenna is energized by an alternating current to emit EM energy through the borehole fluid ("mud") and into the surrounding formation or formations. As used herein, "formation" may refer to a single layer or may include multiple layers. The emitted energy interacts with the borehole and formation to produce signals that are detected and measured by one or more receiver antennas. These detected signals reflect the interactions with the mud and the formation. The measurements are also affected by mud filtrate invasion that changes the properties of the rock near the wellbore. By processing the detected signal data, a log or profile of the formation and/or borehole properties is determined.

The processing of the measured subsurface parameters is done through a process known as an inversion technique (usually referred to as an "inversion"). In general, inversion processing includes making an initial estimate or model of the geometry and properties of the earth formations surrounding the well logging instrument. The initial model parameters may be derived in various ways known in the art. An expected logging instrument response is calculated based on the initial model. The calculated response is then compared with the measured response of the logging instrument. Differences between the calculated response and the measured response are used to adjust the parameters of the initial model, and the adjusted model is used to again calculate an expected response of the well logging instrument. The expected response for the adjusted model is compared with the measured instrument response, and any difference between them is used to again adjust the model. This process is generally repeated until the differences between the expected response and the measured response fall below a pre-selected threshold. By way of example, commonly-owned U.S. Pat. No. 6,594,584 describes some modern inversion techniques and is incorporated herein by reference in its entirety.

Using resistivity measurements made by LWD/MWD tools for well placement is commonly referred as in the industry as "geosteering." In geosteering, estimation of the borehole position in real-time with respect to known geological markers is performed through correlation of resistivity log features in order to make steering decisions. The accuracy of such steering decisions often depends, at least in part, on the inversion technique used. Accordingly, the present disclosure describes novel inversion techniques that provide substantially real-time interpretation for well placement.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

Embodiments disclosed herein relate to the processing of subsurface measurements to determine certain parameters of interest via an inversion. The present disclosure provides inversion techniques that use anti-symmetrized measurements and induction and propagation measurements to estimate formation resistivity and anisotropy at any angle, independent of mud type. In accordance with illustrative embodiments, a minimally biased real-time interpretation approach based on pixel-based inversion is disclosed which does not assume a maximal number of layers, an assumption usually present in some existing model-based inversion approaches. Instead of inverting for distance to boundaries layer thicknesses, bed resistivities, and dip, the presently disclosed inversion techniques invert for distribution of resistivities using predefined thin layers referred to as "pixels." The boundary positions are inferred from changes in resistivities.

The pixel distribution is based on measurement sensitivities, and the pixel size is derived so the contribution of each pixel is nearly the same. Since the problem is over-determined, the regularization is applied penalizing the L1 or L2 norm of conductivity changes (the conductivity gradient). The regularization term weighting is derived adaptively and may be based on several known approaches, such as Occam's inversion or L-curve of generalized cross-validation.

The present disclosure also proposes related methods for visualization and quality control of directional measurement inversion-based interpretation. For instance inversion output, misfits, regularization coefficient values, derived dip and formation consistency, and model covariance matrix (uncertainties), may be used. For embodiments that use the Occam's inversion based interpretation, solutions for different values of regularization coefficient to evaluate uncertainties of the interpreted structure are also described herein.

In one illustrative embodiment, a method includes disposing an electromagnetic logging tool in a borehole penetrating a formation, the electromagnetic logging tool being part of a drill string in the formation, the drill string having a drill bit. The method includes acquiring measurements using the electromagnetic logging tool. The method further includes using a processor to apply a pixel-based inversion to the acquired measurements to determine at least one formation property, wherein applying the pixel-based inversion includes using adaptive regularization.

In one illustrative embodiment, a system is disclosed that performs a method that includes disposing an electromagnetic logging tool in a borehole penetrating a formation, the electromagnetic logging tool being part of a drill string in the formation, the drill string having a drill bit, acquiring measurements using the electromagnetic logging tool, using a processor to apply a pixel-based inversion to the acquired measurements to determine at least one formation property, wherein applying the pixel-based inversion includes using adaptive regularization.

In further illustrative embodiments, a method includes disposing an electromagnetic logging tool in a borehole penetrating a formation. The method includes acquiring measurements using the electromagnetic logging tool. The method further includes using a processor to apply a pixel-based inversion to the acquired measurements to determine at least one formation property, wherein applying the pixel-based inversion includes using adaptive regularization.

In some embodiments, the electromagnetic logging tool is a wireline tool. In other embodiments, the electromagnetic logging tool is an LWD tool.

Again, the brief summary presented above is intended to familiarize the reader with certain aspects and contexts of embodiments of the present disclosure without limitation to the claimed subject matter.

DETAILED DESCRIPTION

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1:
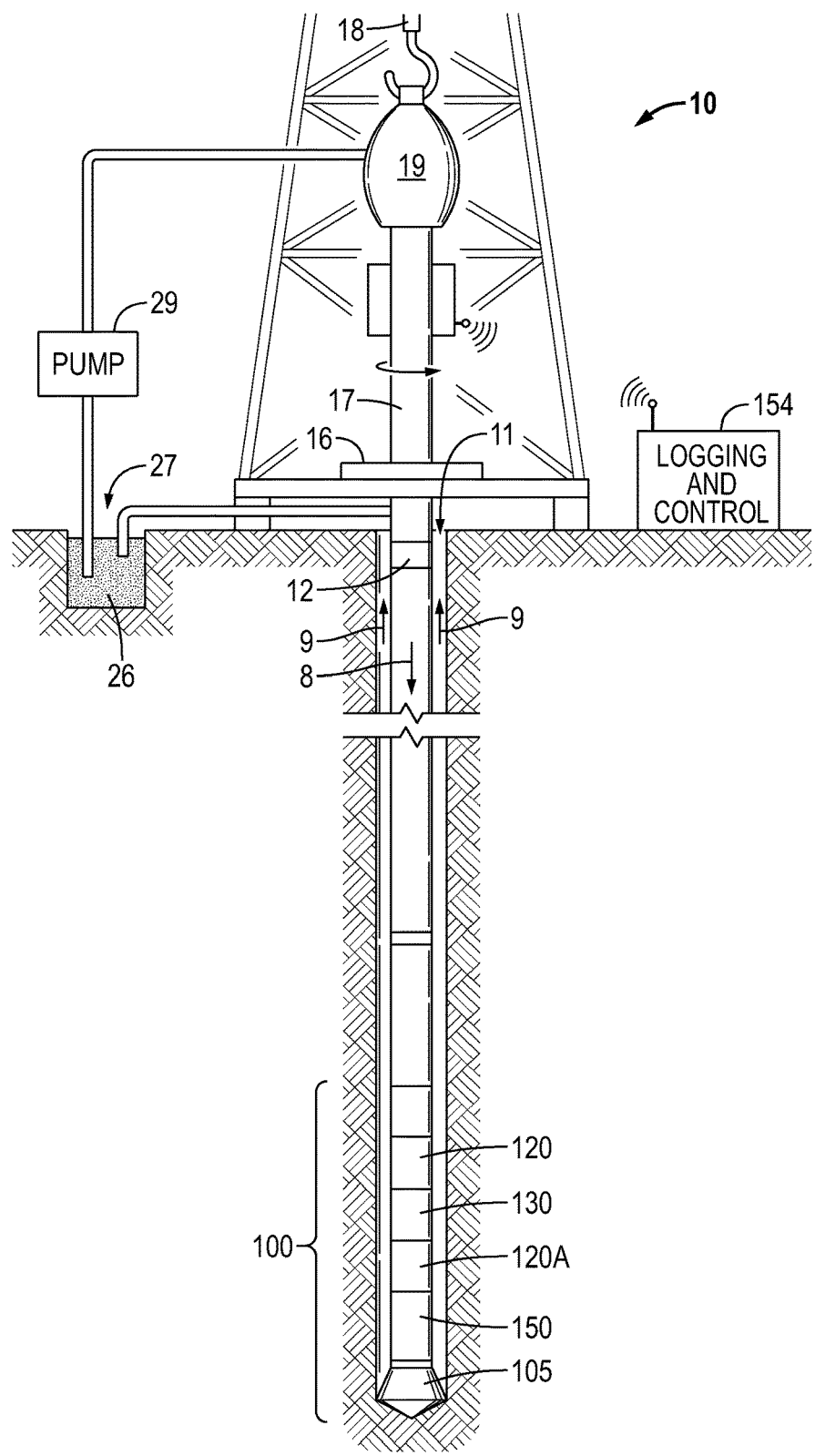
FIG. 1 is a schematic diagram of a wellsite system that may be used for implementation of an example embodiment.

FIG. 1 represents a simplified view of a well site system in which various embodiments can be employed. The well site system depicted in FIG. 1 can be deployed in either onshore or offshore applications. In this type of system, a borehole 11 is formed in subsurface formations by rotary drilling in a manner that is well known to those skilled in the art. Some embodiments can also use directional drilling.

A drill string 12 is suspended within the borehole 11 and has a bottom hole assembly (BHA) 100 which includes a drill bit 105 at its lower end. The surface system includes a platform and derrick assembly 10 positioned over the borehole 11, with the assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is well known, a top drive system could be used in other embodiments.

Drilling fluid or mud 26 may be stored in a pit 27 formed at the well site. A pump 29 delivers the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid exits the drill string 12 via ports in the drill bit 105, and then circulates upwardly through the annulus region between the outside of the drill string 12 and the wall of the borehole, as indicated by the directional arrows 9. In this known manner, the drilling fluid lubricates the drill bit 105 and carries formation cuttings up to the surface as it is returned to the pit 27 for recirculation.

The drill string 12 includes a BHA 100. In the illustrated embodiment, the BHA 100 is shown as having one MWD module 130 and multiple LWD modules 120 (with reference number 120A depicting a second LWD module 120). As used herein, the term "module" as applied to MWD and LWI) devices is understood to mean either a single tool or a suite of multiple tools contained in a single modular device. Additionally, the BHA 100 includes a rotary steerable system (RSS) and motor 150 and a drill bit 105.

The LWD modules 120 may be housed in a drill collar and can include one or more types of logging tools. The LWD modules 120 may include capabilities for measuring, processing, and storing information, as well as for communicating with the surface equipment. By way of example, the LWD module 120 may include an electromagnetic well logging tool, and may include capabilities for measuring, processing, and storing information, and for communicating with surface equipment.

The MWD module 130 is also housed in a drill collar, and can contain one or more devices for measuring characteristics of the drill string and drill bit. In the present embodiment, the MWD module 130 can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 further includes an apparatus (not shown) for generating electrical power for the downhole system. For instance, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

The operation of the assembly 10 of FIG. 1 may be controlled using control system 154 located at the surface. The control system 154 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and so forth.

Figure 2:
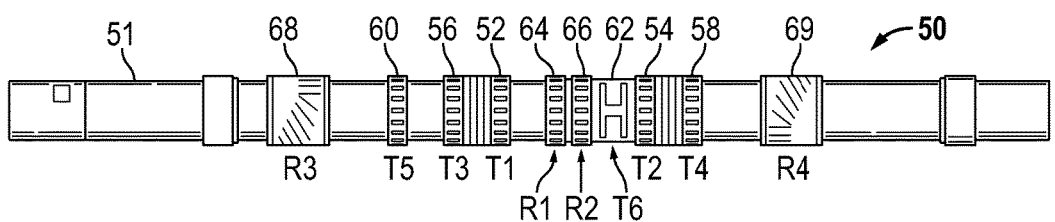
FIG. 2 is an exemplary electromagnetic measurement tool.

FIG. 2 depicts one example of an electromagnetic measurement tool 50, which may be part of the LWD module 120 of FIG. 1, or part of a wireline tool. The tool 50 may be a multi-spacing directional electromagnetic propagation tool. In one embodiment, the tool 50 may be capable of making measurements at multiple frequencies, such as at 100 kHz, 400 kHz, and 2 MHz. In the depicted embodiment, the measurement tool 50 includes multiple transmitters T1, T2, T3, T4, T5, and T6 depicted at 52, 54, 56, 58, 60, and 62 and multiple receivers R1, R2, R3, and R4 depicted at 64, 66, 68, and 69 spaced axially along tool body 51. In the depicted example, measurement tool 50 includes axial, transverse, and tilted antennas. As used herein, an axial antenna is one whose dipole moment is substantially parallel with the longitudinal axis of the tool, for example, as shown at 54. Axial antennas are commonly wound about the circumference of the logging tool such that the plane of the antenna is orthogonal to the tool axis. Axial antennas produce a radiation pattern that is equivalent to a dipole along the axis of the tool (by convention the z-direction). Electromagnetic measurements made by axially oriented antennas may be referred to as conventional or non-directional measurements.

A transverse antenna is one whose dipole moment is substantially perpendicular to the longitudinal axis of the tool, for example, as shown at 62. A transverse antenna may include a saddle coil (e.g., as disclosed in commonly owned U.S. Patent Publications 2011/0074427 and 2011/0238312) and generate a radiation pattern that is equivalent to a dipole that is perpendicular to the axis of the tool (by convention the x or y direction). A tilted antenna is one whose dipole moment is neither parallel nor perpendicular to the longitudinal axis of the tool, for example, as shown at 68 and 69. Tilted antennas generate a mixed mode radiation pattern (i.e., a radiation pattern in which the dipole moment is neither parallel nor perpendicular with the tool axis). Electromagnetic measurements made by transverse or tilted antennas may be referred to as directional measurements.

In the particular embodiment depicted in FIG. 2, five of the transmitter antennas (T1, T2, T3, T4, and T5) are axial antennas spaced along the axis of the tool. A sixth transmitter antenna (T6) is a transverse antenna. First and second receivers (R1 and R2) located axially between the transmitters are axial antennas and may be used to obtain conventional non-directional type propagation resistivity measurements. Third and fourth receivers (R3 and R4) are tilted antennas located axially about the transmitters. Such a directional arrangement (including tilted and/or transverse antennas) produces a preferential sensitivity on one azimuthal side of the tool 50 that better enables bed boundaries and other features of the subterranean formations to be identified and located.

Accordingly, as the tool 50 provides both axial transmitters and axial receiver pairs as well as axial transmitter and tilted receiver pairs, the tool 50 is capable of making both directional and non-directional electromagnetic measurements. Further, the depicted tool 50 in FIG. 2 is capable of providing symmetrized and anti-symmetrized measurements (up and down measurements) with the same antenna spacings. As an example, in one particular embodiment, the tool 50 may be capable of making measurements using transmitter-receiver pairs with spacings of 22, 34, 84, and 96 inches.

The example logging tool 50 depicted in FIG. 2 may be a model of a tool available under the name PERISCOPE® from Schlumberger Technology Corporation of Sugar Land, Tex. It will be understood, however, that the embodiments disclosed herein are not limited to any particular electromagnetic logging tool configuration, and that the tool depicted in FIG. 2 is merely one example of a suitable electromagnetic logging tool. For instance, in other embodiments, the electromagnetic logging tool 120 may have one or more transmitting antennas on a first modular sub and one or more receiver antennas on a second modular sub. The subs containing the transmitting and receiving antennas may be distributed at different locations along the drill string of the well site system 10. As an illustrative example, in one embodiment, one sub (could be transmitter or receiver) may include multiple antennas having tilted dipole moments. The antennas, in one embodiment, may include three antennas with substantially equal angle tilts, but rotated 120 degrees apart azimuthally. In other embodiments, a given sub may include a set of multi-axial collocated antennas, such a tri-axial collocated antenna array having three antennas, each having dipole moments that are orthogonal with respect to the other two. In such modular tool embodiments, transmitter-receiver spacings of greater distances compared to the tool 50 of FIG. 2 can be achieved. For example, in some embodiments, transmitter-receiver spacings of 10 feet or more, 30 feet or more, 60 feet or more, or even 100 feet or more may be achieved, providing for deep directional electromagnetic measurements.

As discussed above, the processing of subsurface measurements to determine certain parameters of interest is referred to as an inversion. The present disclosure provides inversion techniques that use anti-symmetrized measurements and induction and propagation measurements to estimate formation resistivity and anisotropy at any angle, independent of mud type. In accordance with illustrative embodiments, a minimally biased real-time interpretation approach based on pixel-based inversion is disclosed which does not assume a maximal number of layers, an assumption usually present in some existing model-based inversion approaches. Instead of inverting for distance to boundaries layer thicknesses, bed resistivities, and dip, the presently disclosed inversion techniques invert for distribution of resistivities using predefined thin layers referred to as "pixels." The boundary positions are inferred from changes in resistivities.

The pixel distribution is based on measurement sensitivities, and the pixel size is derived so the contribution of each pixel is nearly the same. As an illustrative example, using 37 to 80 pixels may enable one to resolve more than 10 layers. Since the problem is over-determined, the regularization is applied penalizing the L1 or L2 norm of conductivity changes (the conductivity gradient). The regularization term weighting is derived adaptively and may be based on several known approaches, such as Occam's inversion or L-curve of generalized cross-validation.

The present disclosure also proposes related methods for visualization and quality control of directional measurement inversion-based interpretation. For instance inversion output, misfits, regularization coefficient values, derived dip and formation consistency, and model covariance matrix (uncertainties), may be used. For embodiments that use the Occam's inversion based interpretation, solutions for different values of regularization coefficient to evaluate uncertainties of the interpreted structure are also described herein.

Pixel-Based Gauss-Newton Inversion

Inversion minimizes the cost function in terms of difference between the modeled tool response and the actual measurements, sometimes referred as the error term, through adjusting the formation model, defined by geometry and properties. The cost function may be augmented with an additional regularization term. The balance between the error and the pixel regularization is typically determined heuristically (see e.g., Dennis et al., "Numerical Methods for Unconstrained Optimization and Non-Linear Equations," SIAM Classics in Applied Mathematics (1996); Nocedel et al., "Numerical Optimization," 2nd ed. Springer Series in Operations Research (2006)) or may be managed by adaptive regularization methods (see e.g., Constable et al., "Occam's Inversion: A Practical Algorithm for Generating Smooth Models from Electromagnetic Sounding Data," Geophysics, vol. 52, no. 3, pp. 289-300 (1987); Farquharson et al., "A Comparison of Automatic Techniques for Estimating the Regularization Parameter in Non-Linear Inverse Problem," Geophys. J. Int. 156, pp. 411-425 (2004)). In a 1D inversion, the forward modeling code used is may be standard anisbeds which computes the response of point dipoles in a layered anisotropic 1D medium.

The Cost Function and its Deterministic Minimization

The inversion minimizes the function $e(x)$, defined as a difference between the simulated tool response $s(x)$ of the unknown 1D formation parameters x and the measurement data m, $e(x)=|s(x)-m|$. Usually, the square of the weighted error is minimized, so the data error term residual $\chi^2$ may be defined as:

$$\chi^2 = \|W_d \cdot e(x)\|,$$

where the diagonal weight matrix $W_d$ has entries typically as close as possible to the expected standard deviation of corresponding measurement channels $W_d = \text{diag}(1/\sigma_i)$.

In accordance with embodiments of the present disclosure, a second (regularization) term is added to the cost function to improve the inversion convergence.

$$C(x) = \frac{1}{2}\chi^2 + \frac{1}{2}\lambda_r \|W_x \cdot (x - x_{ref})\|^2$$

Here, the regularization term biases the solution towards $x_{ref}$, which may be chosen as the value from the previous step in order to penalize large parameter steps, and reduce the influence of the noise on the calculated step. The regularization term $\lambda$ may be proportional to squared error $\lambda_r = \lambda_{input} \|W_d \cdot e(x)\|^2$, to decrease the inversion bias as approaching towards global minimum. See, e.g., Abubakar et al., "A Three-Dimensional Parametric Inversion of Multi-Component Multi-Spacing Induction Logging Data," SEG Annual Meeting, Oct. 10-15, 2004.

The cost function is minimized in an iterative manner: for a given parameter set x (the initial guess) and a step p is derived from the linearization of the cost function that decreases the cost function. It is used to update the parameter set to $x_{new}=x+p$. This procedure is repeated until convergence, i.e. when the cost function falls below the convergence criterion, its minimum is found, or maximal parameter change is below a predefined threshold.

If the Huber inversion is used (robust to data outliers and noise), the data error term of the cost function changes to:

$$\chi^2 = \sum_i \varphi(w_i \cdot e_i(x))$$

with the Huber function $$\varphi(y) = \begin{cases} y^2 & |y| < \Delta \\ 2\delta(|y| - 0.5\Delta) & |y| > \Delta \end{cases}$$

where function y corresponds to data error (difference between measurement and model) and $\Delta$ is the threshold where the error calculation switches from squared to linear. Use of Huber function for the error term and the expected noise standard deviation of the corresponding measurement channels for $\Delta$ makes the inversion more robust to outliers in the data. See, e.g., Ekblom et al., "Algorithms for non-linear Huber estimation," BIT 29, pp. 69-76 (1989). The solution of this iterative minimization (found minimum) is dependent on the starting point (the initial guess). The deterministic Gauss-Newton inversion is sometimes limited to finding a local minimum, which may be very different from the true solution (global minimum). Multiple initial guesses are typically tried in order to find the global minimum.

Model Parameterization

Figure 3:
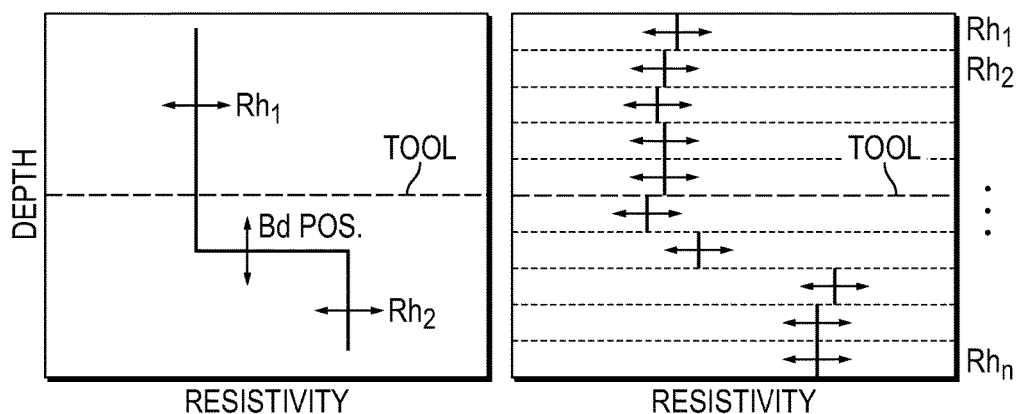
FIG. 3 depicts a model parameterization for pixel-based inversion compared to conventional model-based inversion.

FIG. 3 illustrates the model parameterization for the pixel-based inversion (right) compared to conventional model-based inversion (left). In the model-based approach, geometry (distance to boundaries and/or layer thicknesses and/or dip) and formation properties (horizontal resistivity with different options for anisotropy) are jointly inverted. The pixel-based approach divides the formation into a large number of thin layers. The division may be done in a way such that the contribution of each sub-layer is the same or comparable, with the properties and/or dip being determined via inversion and the position of boundaries being estimated based on resistivity changes.

Figure 4:
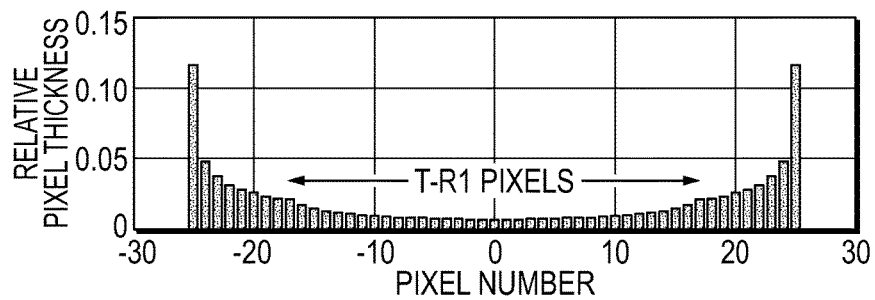
FIG. 4 illustrates an exemplary distribution of pixels.

A typical distribution of pixels (e.g., the "layer" thicknesses) is shown in FIG. 4, where pixel size increases quadratically, while the minimal layer thickness may be about 1% of the transmitter-receiver spacing distance in some embodiments. For the tool 50 of FIG. 2, pixel size may be 2-3 inches in one example. Discretization is defined for each spacing individually, and for joint inversion, the pixelization may be merged in the order of depth of investigation, going from the shallowest (shortest spacing) to the deepest (longest spacing) in order to preserve the resolution of shallow measurements.

Gradient Regularization

When compared to model-based inversion where number of parameters is typically small (e.g., less than the number of available measurements), in the pixel-based inversion, the number of parameters is often much greater. Thus, the proper regularization is used in order to solve the problem successfully. To avoid artifacts when using pixel-based approaches, embodiments provide an inversion algorithm that has been adapted. For instance, instead of solely minimizing a data error term, a layer resistivity differences term $C_{grad}$ (often called "gradient penalization") is added to the standard regularization term:

$$C(x) = \tfrac{1}{2}\chi^2 + \tfrac{1}{2}\lambda_r \|W_x \cdot (x - x_{ref})\|^2 + C_{grad}$$

Several options are available for resistivity gradient regularization. First there is a choice of norm, which may include:

$L_2$ norm producing smooth models: $C_{grad} = \tfrac{1}{2}\|W_s \cdot R \cdot x\|^2$
$L_1$ norm producing blocky models with some transitions:

$$C_{grad} = \tfrac{1}{2}\lambda \Sigma_i \sqrt{(W_{si} \cdot R_i \cdot x)^2 + C^2}$$

where $\lambda$ is the gradient penalization constant, R is the diagonal matrix containing the resistivity differences, and $W_s$ are the corresponding diagonal weights. Here, the constant $\lambda$ balances the error term and the gradient penalization and determines how much detail the inversion can resolve. $\lambda$ may be estimated using adaptive regularization approaches as described herein.

In some applications, $L_1$ norm may be chosen for interpretation of deep directional measurements, as it tends to produce less artifacts and is more conservative. In other situations, L2 norm may be chosen instead. In addition to L1 and L2 norms, a general $L_p$, p<1 norm, may be used and is able to produce blocky models, however with additional costs.

Adaptive Regularization Options

The gradient penalization term plays a role to balance data misfit and resistivity smoothness and to prevent one or the other from being overly dominant. Different methods for an automatic and optimal choice of $\lambda$ are available, such as:

Occam's Method

Figure 5:
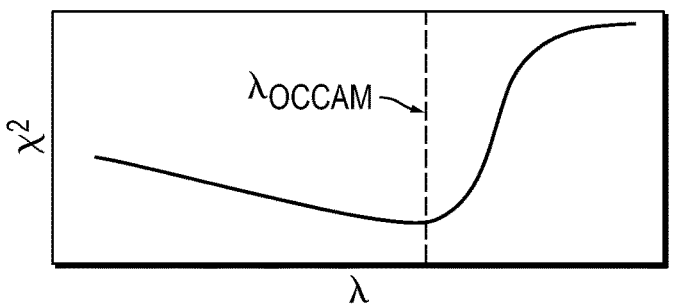
FIG. 5 is a graph showing an example Gauss-Newton step using Occam's method.

Here, in each iteration, the Gauss-Newton step p (minimizing the linearized cost function) is computed for a range of $\lambda$ values, starting with a high value and successively decreasing it, as shown in FIG. 5. Each Gauss-Newton step leads to a new parameter estimate $x_{new} = x+p$ with its own residual. The $x_{new}$ derived from high values of $\lambda$ will lead to a high residual (even higher than the residual of the current point x). Reducing $\lambda$ decreases the residual up to a point when the residual increases again, when the new solution starts fitting the noise and shows too much detail. The $\lambda$ value corresponding to the minimal residuals of all tested steps is selected as being "optimal" using Occam's method. See, e.g., Constable (1987).

L-Curve Method

Figure 6:
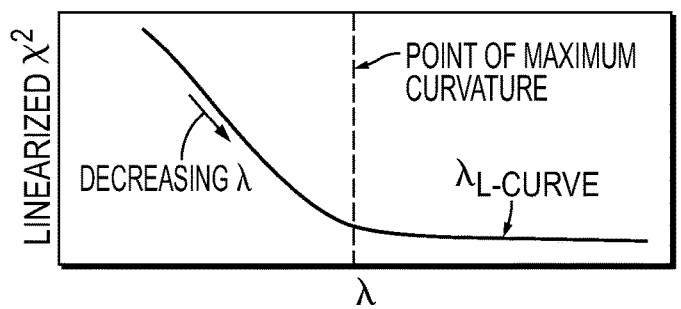
FIG. 6 is a graph showing an example Gauss-Newton step using the L-curve method.

The Gauss-Newton step p and the new parameter is used to estimate $\lambda$ values. Then, the linearized residual (not the true residual in Occam's method) is evaluated against the regularization term $C_{grad}$ in a log-log diagram (called "L-curve"), as shown in FIG. 6. The linearized residual decreases monotonically with the regularization term. Here, the maximum curvature (slope change) point of the L-curve corresponds to the optimal $\lambda$ used for the gradient penalization. See e.g., Farquharson 2004.

Generalized Cross-Validation

Cross-validation, originally a noise estimation method, can also be applied to estimate gradient penalization. Here, the Gauss-Newton step is computed multiple times with a different subset of data. The linearized residual is used to find the fit to the data points that have been left out is checked for a wide range of $\lambda$. The lowest $\lambda$ before the misfit to the left out data point increases indicates the point where noise fitting happens and represents the desired gradient penalization. It is appreciated that generalized cross-validation is a simplified procedure, based on omitting a single data point, when analytical function can be used in cross-validation computation. See, e.g., Farquharson 2004.

It is noted that regardless of which regularization technique is applied, in each inversion iteration, an optimal value for $\lambda$ is estimated. In field testing in simulations, Occam's method has been found to be particularly robust.

Inversion-Based Real-Time Well Placement Interpretation Workflows

In accordance with illustrative embodiments of the present disclosure, pixel-based inversion is used as a building block for development of inversion-based interpretation workflows. Four separate workflows are presented for different scenarios of using deep directional electromagnetic measurements for real-time interpretation and steering decision making. These workflows are described in the context of a first tool, such as the logging tool 50 shown in FIG. 2 (referred to here as "Periscope"), and the modular tool also described above having separate transmitter and receiver subs distributed along a drill string (referred to here as deep directional resistivity tool—"DDR").

PeriScope Workflow

Figure 7:
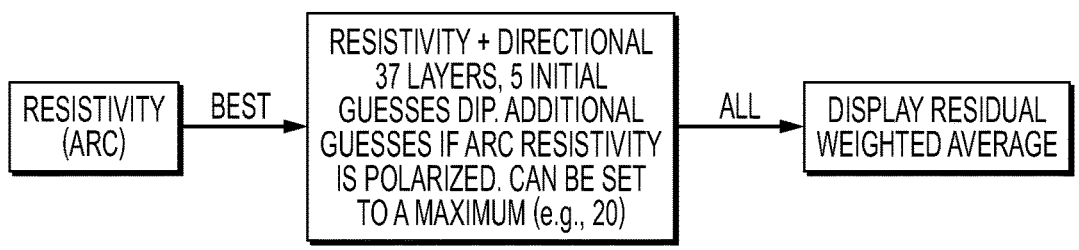
FIG. 7 is an exemplary workflow.
Figure 8:
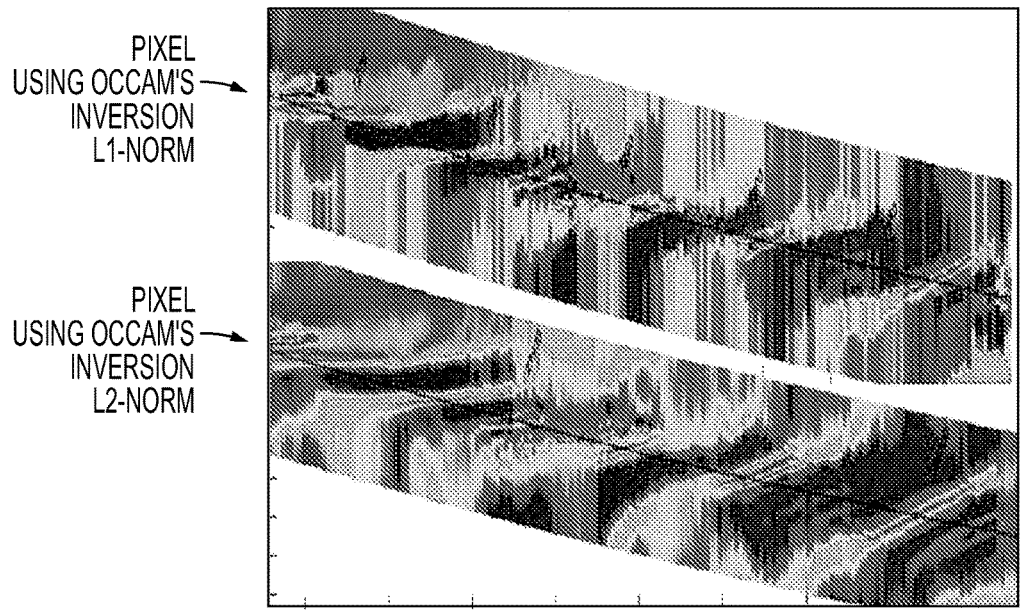
FIG. 8 is an illustration of an inversion result.

The workflow is illustrated in FIG. 7. In the first step, conventional (non-directional) resistivity measurements (referred to herein as "ARC"—similar to measurements that could be acquired using Schlumberger's ARCVISION tool) are inverted to get an initial background resistivity. If the resistivity data are not well reconstructed in the first step, additional formation resistivities are generated. The default output is the weight-averaged model for each station. In the illustrated embodiment, for all initial resistivity backgrounds, all PeriScope data are inverted using a number of initial guesses (e.g., 5) corresponding to different formation dip. If the ARC measurements are polarized, additional guesses can be used. The PeriScope measurements are inverted all at once. An example of inversion results for $L_1$ and $L_2$ gradient regularization is shown in FIG. 8.

Conventional Resistivity (ARC)-DDR Workflow

Figure 9:
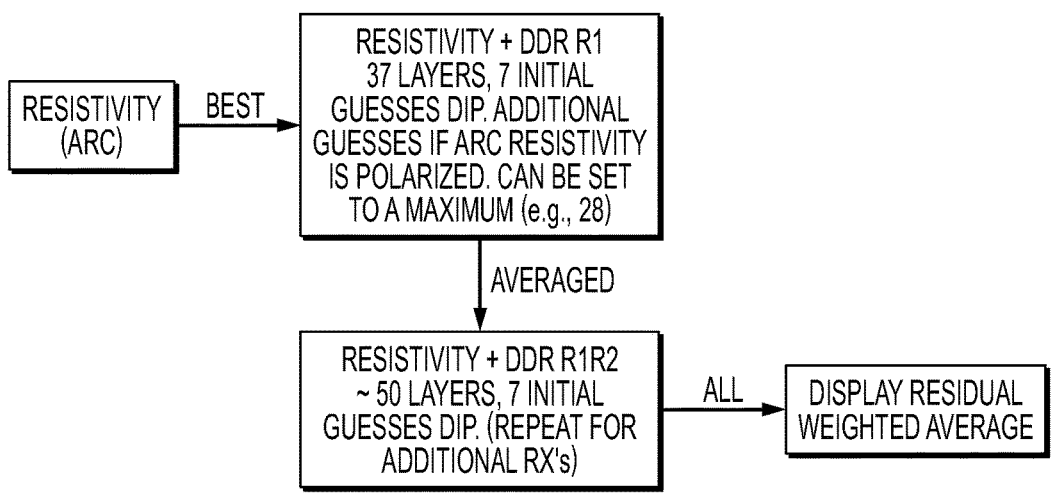
FIG. 9 is an exemplary workflow.

The workflow is illustrated in FIG. 9. The initial inversion of resistivity channels to find the background resistivity is followed by inversion of resistivity and short spacing data for a number of initial guesses (e.g., 7) for the dip. If resistivity data is not well reconstructed, additional initial guesses for background resistivity may be generated. After the short spacings, additional measurement spacings are added in subsequent steps from shallow to deep, each time inverting the number of initial guesses.

Figure 10:
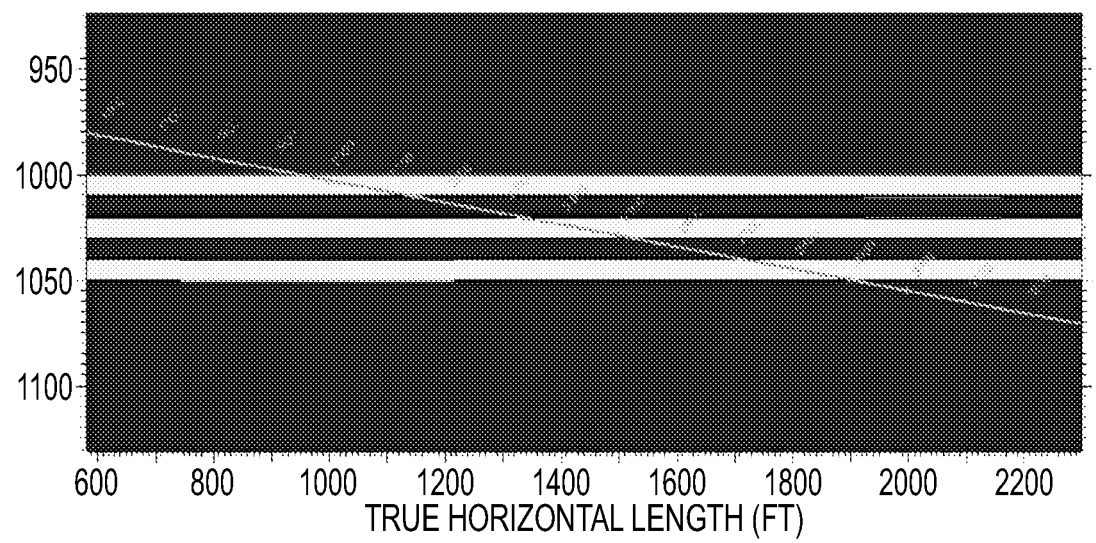
FIG. 10 is an exemplary model.
Figure 11:
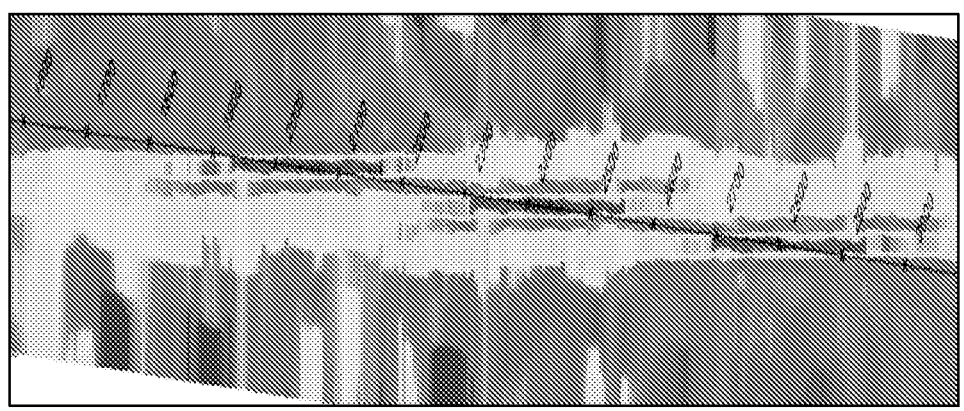
FIG. 11 is an illustration of an inversion result.

An inversion example using synthetic data for a 7-layer anisotropic synthetic model shown in FIG. 10 (three 10 ft 50 Ωm resistive layers are embedded in anisotropic background Rh=2 Ωm and Rv=8 Ωm with internal layer thickness of 10 ft), is presented in FIG. 11. In this illustrative example, two DDR spacings, 40 ft and 80 ft, are used along with the conventional resistivity channels.

Directional EM-Resistivity (PeriScope)-DDR workflow

Figure 12:
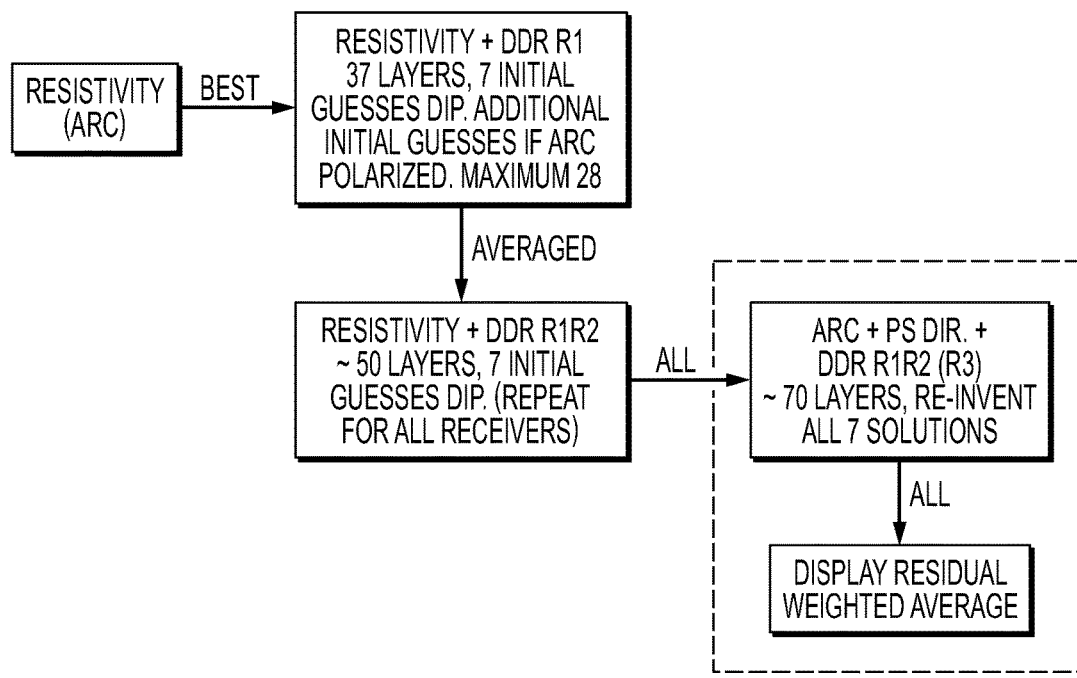
FIG. 12 is an exemplary workflow.
Figure 13:
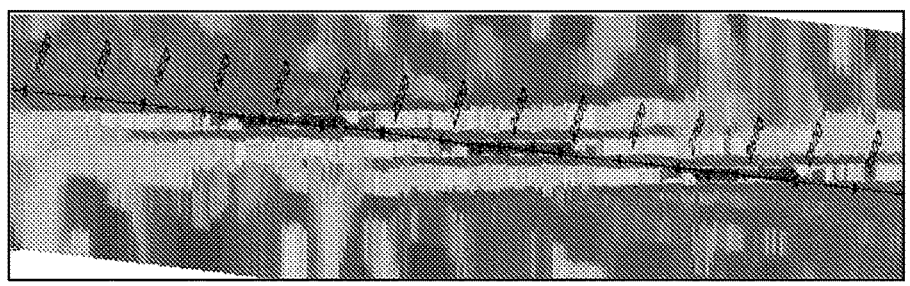
FIG. 13 is an illustration of an inversion result.

The workflow is illustrated in FIG. 12. The workflow is derived from the original ARC-DDR workflow shown in FIG. 9, but where in the last step, the PeriScope data is added, and a joint PeriScope-DDR inversion is run for a number of initial guesses (e.g., 7). An example of inversion results using the workflow of FIG. 12 is shown in FIG. 13 as applied to the test formation of FIG. 10.

Standalone DDR Workflow

Figure 14:
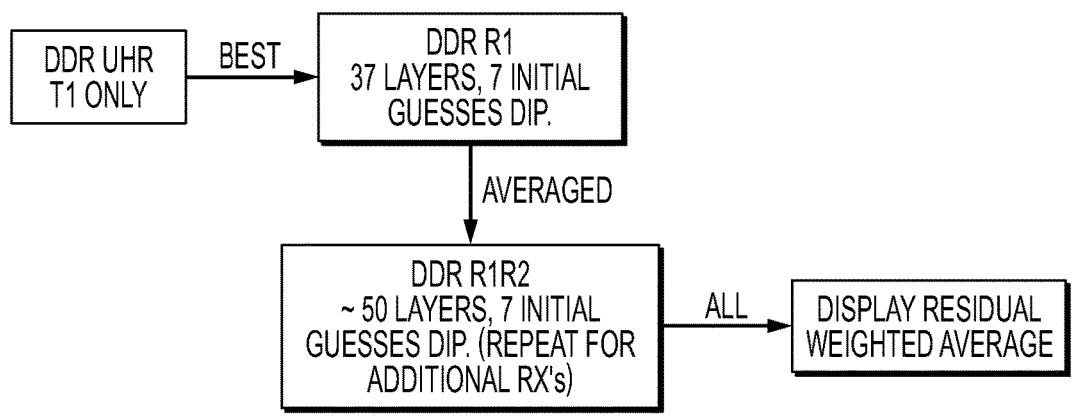
FIG. 14 is an exemplary workflow.
Figure 15:
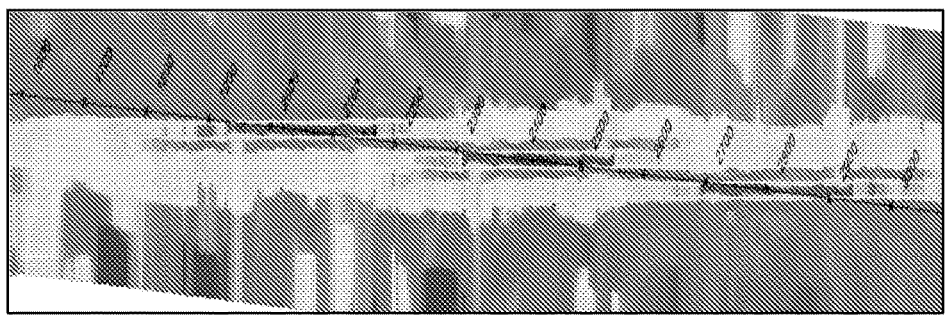
FIG. 15 is an illustration of an inversion result.

The workflow is illustrated in FIG. 14. It is similar to the ARC-DDR workflow, except since no conventional resistivity data is available, the short spacing harmonic resistivity data is used to estimate the background resistivity. An example of inversion results using this workflow is shown in FIG. 15 as applied to the test formation of FIG. 10.

Evaluation of Formation Anisotronic Resistivity Profile

Figure 16:
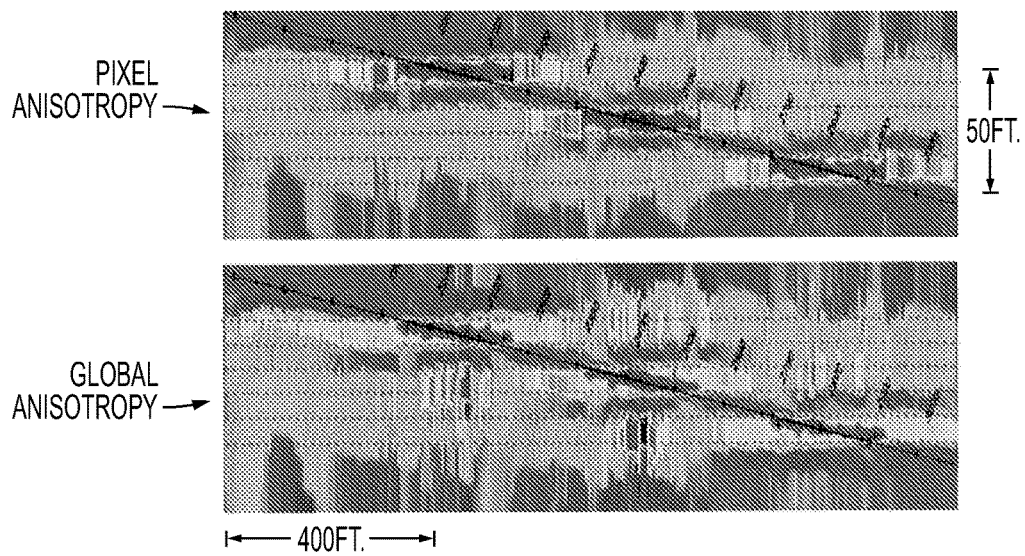
FIG. 16 is an illustration of an inversion result.

Traditionally, in real-time inversion workflows, the middle ("tool layer") is assumed to be anisotropic for PeriScope interpretation, or a single, uniform, anisotropy of the formation is assumed for DDR data interpretation. See, e.g., Omeragic et al., "Real-Time Interpretation of Formation Structure From Directional EM Measurements," 47th SPWLA Annual Symposium, Jun. 4-7, 2006. However, the very deep measurements are sensitive to anisotropy distribution, and assumption of global anisotropy may create artifacts. An example of difference assuming global and local anisotropy is shown in FIG. 16.

Figure 17:
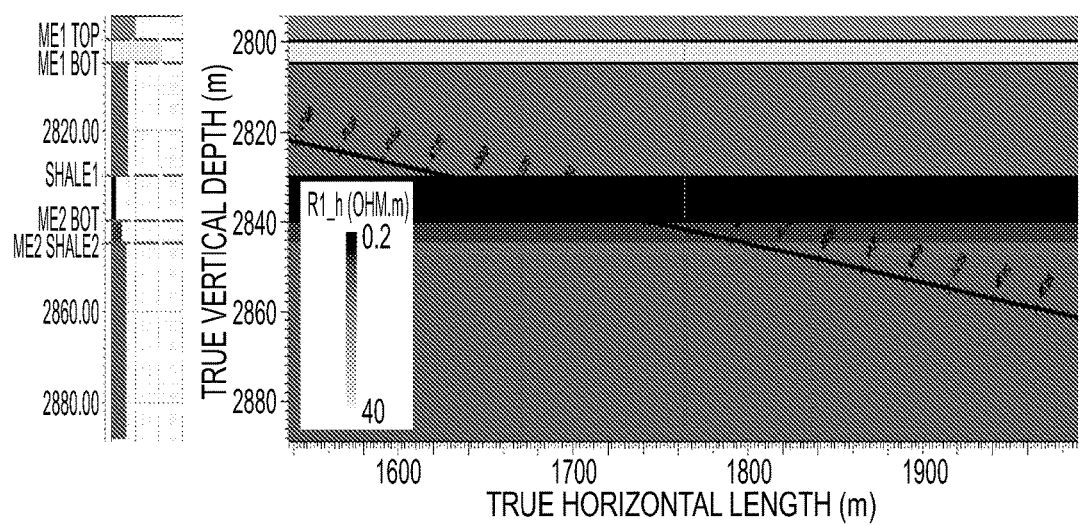
FIG. 17 is an illustration of a resistivity profile.
Figure 18:
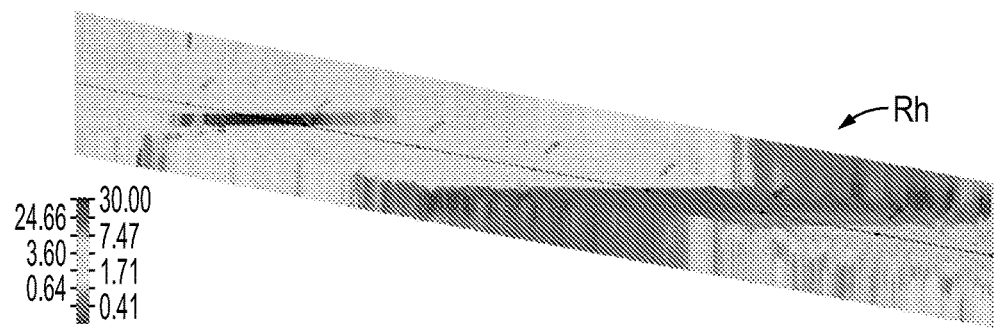
FIG. 18 is an illustration of an inversion result.
Figure 18:
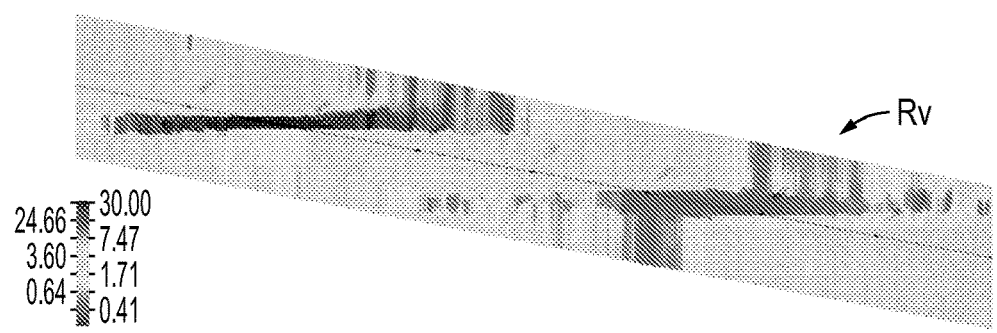

An example of applicability of this approach to anisotropic low contrast Rh formation is shown in FIG. 17. The layer resistivity profile is Rh=[2 30 1 0.3 0.55 0.8] Ωm, Rv=[2 30 3 0.3 1.1 2.4] Ωm, where thin wet (conductive) sand layer (R=0.3 Ωm) is between anisotropic shales. It can be seen that using the pixel based inversion, as shown in FIG. 18, one is able to identify the isotropic sand before crossing from thick anisotropic shale zone (Rh=1 Ωm, Rv=3 Ωm) and also to identify the low contrast thin shale lenses (Rh=0.55 Ωm, Rv=1.1 Ωm) before hitting the shale.

Inversion Quality Control and Uncertainty Evaluation

Figure 19:
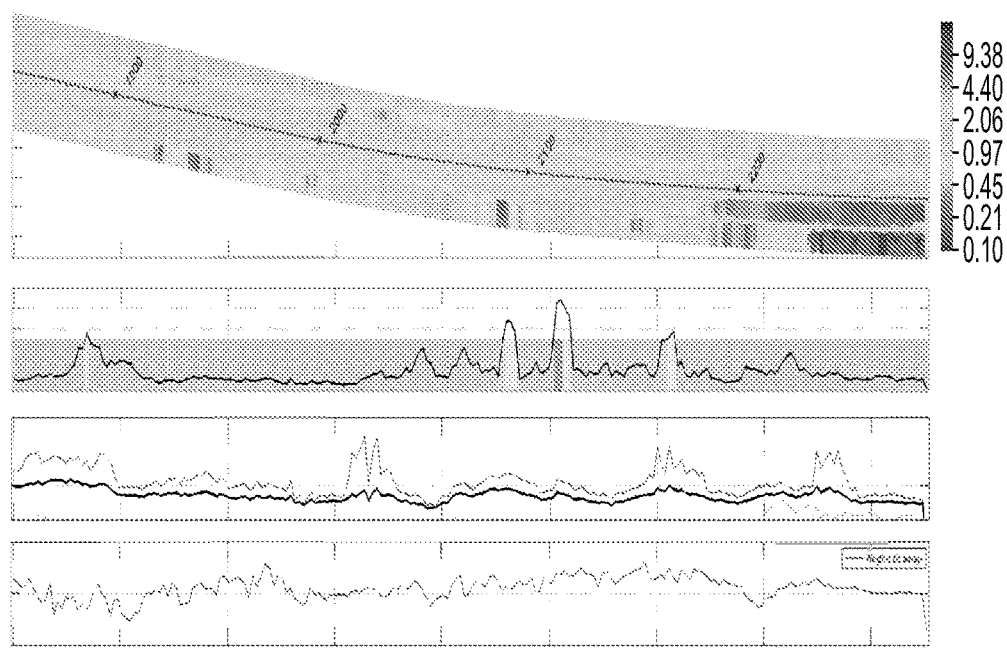
FIG. 19 illustrates the use of inversion output for quality control evaluation.

FIG. 19 illustrates the use of inversion output for quality control evaluation. Available quantities are:

inversion residual as a measure of quality of data fit

Huber norm, showing contribution of noise and outliers

Mismatch—normalized difference between modeled data and measurements ($L_1$ norm)—can be used to identify good quality, borderline good and less reliable interpretation results, and can be color coded, as shown in FIG. 19

Gradient penalization coefficient $\lambda$ measure the level of regularization, if too low there is a risk that data are over-fitted, if too high the model may be too conservative Inverted formation dip, should be checked for consistency against inversion resistivity image derived dip. Large variation of dip usually happens if the inversion is not reliable.

Figure 20:
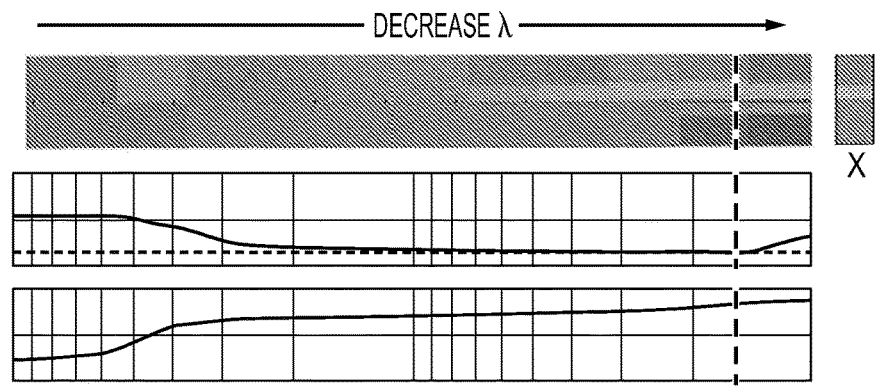
FIG. 20 is an exemplary model.
Figure 21:
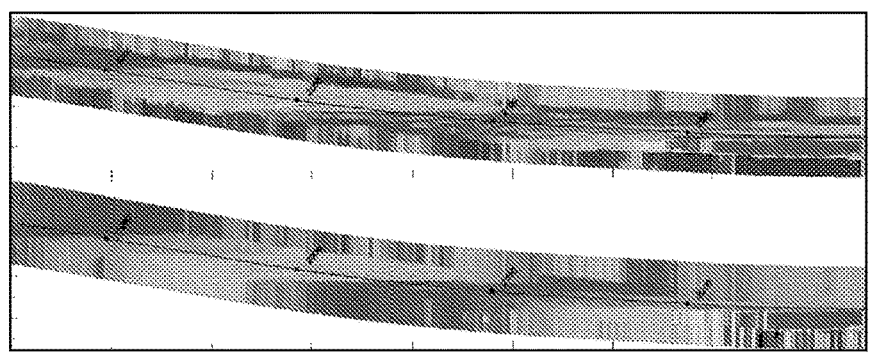
FIG. 21 is an exemplary model.
Figure 22:
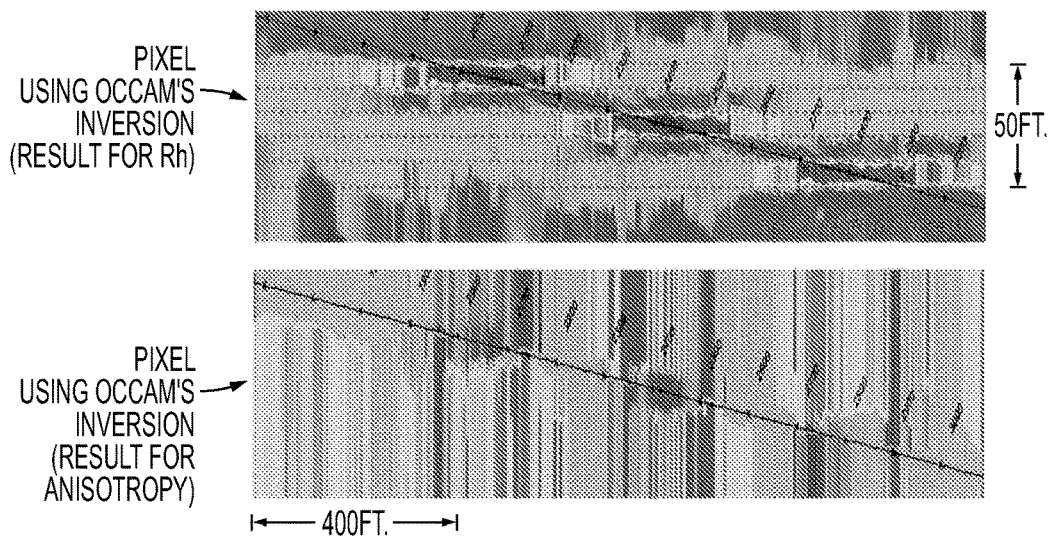
FIG. 22 is an exemplary anisotropy image.

The adaptive regularization provides additional information about the quality of inversion and model complexity that can be used in the real-time or post-job interpretation process. By observing the models with large regularization $\lambda$, one can obtain information about the high-confidence boundaries in the model, or coarser models that may explain the data. For instance, referring to FIG. 20, the Occam's inversion adaptive process shows that the dependence of the solution on the choice of the adaptive regularization coefficient $\lambda$. Here, solutions taken from the last inversion step with a different $\lambda$, but sufficiently low misfit represents the level of confidence in the structure. FIG. 21 shows high confidence boundaries. The top model shows one inversion result using Occam's inversion. The bottom plot shows the extracted models from Occam's algorithm with a ten times larger regularization $\lambda$. It can be seen that just the high confidence boundaries remain in this plot. In addition, the anisotropy image, shown in FIG. 22 can be used in quality control. For instance, large change and inconsistencies in anisotropy can be used as a quality control indicator.

As will be understood, the various techniques described above and relating to applying pixel-based inversion techniques for real-time interpretation for well placement and geosteering are provided as example embodiments. Accordingly, it should be understood that the present disclosure should not be construed as being limited to just the examples provided above. Further, it should be appreciated that the inversion techniques disclosed herein may be implemented in any suitable manner, including hardware (suitably configured circuitry), software (e.g., via a computer program including executable code stored on one or more tangible non-transitory computer readable medium), or via using a combination of both hardware and software elements. Further, it is understood that the various inversion techniques described may be implemented on a downhole processor (e.g., a processor that is part of a downhole logging/imaging tool), with the results sent to the surface by any suitable telemetry technique. Additionally, in other embodiments, resistivity measurement data may be transmitted uphole via telemetry, and the inversion may be performed uphole on a surface computer (e.g., part of control system 154 in FIG. 1).

The pixel-based methods and systems described herein are not limited to any particular wellbore application. The methods and systems described herein can be used with LWD systems, such as the one shown in FIG. 1. Also, the methods and systems described herein can be applied to measuring-while-drilling systems (e.g., MWD tools) or to wireline systems (e.g., a wireline tool) for characterizing reservoirs. Illustrative embodiments can also be used with any suitable means of conveyance, such as armored cable or coiled tubing.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A method for determining at least one property of a subterranean formation, the method comprising:
   rotating a bottom hole assembly including a drill bit and an electromagnetic logging tool in a borehole penetrating the subterranean formation, the electromagnetic logging tool including a plurality of axially spaced transmitters and axially spaced receivers, at least one of the transmitters and at least one of the receivers including a transverse or tilted antenna;
   using the electromagnetic logging tool to acquire electromagnetic measurements of the subterranean formation while rotating the bottom hole assembly in the borehole; and
   causing a processor to process the acquired electromagnetic measurements using a pixel-based inversion to determine at least one formation property of the subterranean formation, wherein said pixel-based inversion processing comprises minimizing a cost function in an iterative manner, the cost function including a gradient penalization term having a gradient penalization constant, wherein an optimum gradient penalization constant value is selected using an adaptive regularization routine that optimizes the gradient penalization constant values.

2. The method of claim 1, wherein the adaptive regularization routine comprises at least one of Occam's inversion, L-curve, or generalized cross-validation.

3. The method of claim 1, wherein the at least one formation property of the subterranean formation comprises at least one of a distribution of layer resistivities for the subterranean formation, a horizontal resistivity of the subterranean formation, a vertical resistivity of the subterranean formation, a resistivity anisotropy ratio, or a dip angle.

4. The method of claim 1, wherein the acquired electromagnetic measurements include directional measurements and non-directional measurements at a plurality of axial spacings.

5. The method of claim 1, further comprising steering the drill bit based at least partially on the formation property determined by the pixel-based inversion.

6. The method of claim 1, wherein the electromagnetic logging tool is a logging while drilling (LWD) tool.

7. The method of claim 1, wherein the electromagnetic measurements are processed to determine the at least one formation property in real time while rotating the bottom hole assembly.

8. The method of claim 1, wherein the cost function is expressed mathematically as follows:

$$C(x)=\frac{1}{2}\chi^2+\frac{1}{2}\lambda_r\|W_x\cdot(x-x_{ref})\|^2+C_{grad}$$

wherein $C(x)$ represents the cost function, $\chi^2$ represents a data error term residual, $\lambda_r$ represents a regularization term, $W_x$ represents a weighting matrix, $x-x_{ref}$ represents a model error term, and $C_{grad}$ represents the gradient penalization term.

9. The method of claim 1, wherein the adaptive regularization routine comprises (i) computing residuals corresponding to a plurality of candidate gradient penalization constant values in each iteration of said minimizing the cost function and (ii) selecting the candidate gradient penalization constant value corresponding to a minimum of the residuals computed in (i).

10. The method of claim 1, wherein the adaptive regularization routine comprises (i) computing residuals corresponding to a plurality of candidate gradient penalization constant values in each iteration of said minimizing the cost function, (ii) linearizing the computed residuals, (iii) evaluating the linearized residuals against the plurality of candidate gradient penalization constant values in a log-log diagram, and (iv) selecting the candidate gradient penalization constant value corresponding to a maximum curvature in the log-log diagram.

11. The method of claim 1, wherein the pixel-based inversion comprises a 1D pixel-based inversion.

12. A system, comprising:
   a drill string configured to be disposed in a borehole within a subterranean formation;
   a drill bit connected to the drill string;
   an electromagnetic logging tool connected to the drill string and configured to make electromagnetic measurements, the electromagnetic logging tool including a plurality of axially spaced transmitters and axially spaced receivers, at least one of the transmitters and at least one of the receivers including a transverse or tilted antenna; and
   a processor configured to receive the electromagnetic measurements from the electromagnetic logging tool made while rotating in a borehole that penetrates the subterranean formation and to process the received electromagnetic measurements using pixel-based inversion to determine at least one formation property of the subterranean formation, wherein processing the pixel-based inversion comprises minimizing a cost function in an iterative manner, the cost function including a gradient penalization term having a gradient penalization constant, wherein an optimum gradient penalization constant value is selected using an adaptive regularization routine that optimizes the gradient penalization constant values.

13. The system of claim 12, wherein the adaptive regularization routine comprises at least one of Occam's inversion, L-curve, or generalized cross-validation.

14. The system of claim 12, wherein the at least one formation property of the subterranean formation comprises at least one of a distribution of layer resistivities for the subterranean formation, a horizontal resistivity of the subterranean formation, a vertical resistivity of the subterranean formation, a resistivity anisotropy ratio, or a dip angle.

15. The system of claim 12, wherein the acquired electromagnetic measurements include directional measurements and non-directional measurements at a plurality of axial spacings.

16. The system of claim 12, wherein the electromagnetic tool is a logging while drilling (LWD) tool.

* * * * *